United States Patent
Lee et al.

(10) Patent No.: US 7,542,829 B2
(45) Date of Patent: Jun. 2, 2009

(54) LOW EARTH ORBIT SATELLITE COMMAND PLANNING DEVICE AND METHOD, AND LOW EARTH ORBIT SATELLITE CONTROL SYSTEM INCLUDING THE SAME

(75) Inventors: Byoung-Sun Lee, Daejeon (KR); Jeong-Sook Lee, Daejeon (KR); Hee-Sook Mo, Daejeon (KR); Jae-Hoon Kim, Daejeon (KR); Seong-Pal Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 443 days.

(21) Appl. No.: 10/536,601

(22) PCT Filed: Sep. 26, 2003

(86) PCT No.: PCT/KR03/01973

§ 371 (c)(1),
(2), (4) Date: Sep. 28, 2005

(87) PCT Pub. No.: WO2004/048197

PCT Pub. Date: Jun. 10, 2004

(65) Prior Publication Data
US 2006/0136103 A1    Jun. 22, 2006

(30) Foreign Application Priority Data
Nov. 28, 2002 (KR) .................... 10-2002-0074682

(51) Int. Cl.
| G05D 1/00 | (2006.01) |
| G05D 3/00 | (2006.01) |
| G06F 7/00 | (2006.01) |
| G06F 17/00 | (2006.01) |
| G06F 19/00 | (2006.01) |
| G06G 7/70 | (2006.01) |
| G01S 1/00 | (2006.01) |
| H04B 7/00 | (2006.01) |
| B64G 1/00 | (2006.01) |

(52) U.S. Cl. .................. 701/13; 701/3; 701/4; 701/11; 701/120; 342/357.01; 342/355; 244/158.1

(58) Field of Classification Search .................. 701/11, 701/13, 120
See application file for complete search history.

(56) References Cited

U.S. PATENT DOCUMENTS
5,506,780 A * 4/1996 Montenbruck et al. ...... 701/226
(Continued)

FOREIGN PATENT DOCUMENTS
| KR | 1998-038854 | 8/1998 |
| KR | 10-0204051 | 3/1999 |

OTHER PUBLICATIONS

Allan s. Posner; "Lessons Learned from the Design and Development of the Satellite Control Center (SCC) for the Far Ultraviolet Spectroscopic Explorer (FUSE) Mission", Spaceops 98, Paper ID: 1b005, Jun. 7, 1998.
Hee-Sook Mo, et al; "Development and Testing of Satellite Operation System for Korea Multipurpose Satellite-I"; ETRI Journal, vol. 22, No. 1, Mar. 2000.
S. Haag, et al; "Use of WWW Technology for Mission Control Systems", ESA Bulleton No. 97, Mar. 1999.

Primary Examiner—Thomas G Black
Assistant Examiner—Sze-Hon Kong
(74) Attorney, Agent, or Firm—Ladas & Parry LLP (57) ABSTRACT

Disclosed is a command planning apparatus of a low-earth orbit satellite, and a low-earth orbit satellite control system including the same. The present invention automates the process of executing the command plan for converting the satellite task schedule planned on the ground into telecommands available by the satellite in the low-earth orbit satellite control system, and automatically selects a data set established by the parameters related to the execution task of the satellite according to the mapping rule.

16 Claims, 5 Drawing Sheets

U.S. PATENT DOCUMENTS

| | | | | |
|---|---|---|---|---|
| 5,687,084 A | * | 11/1997 | Wertz | 701/226 |
| 5,806,802 A | * | 9/1998 | Scott | 244/172.4 |
| 5,963,166 A | | 10/1999 | Kamel | |
| 6,056,237 A | * | 5/2000 | Woodland | 244/3.15 |
| 6,275,677 B1 | * | 8/2001 | Tandler | 455/12.1 |
| 6,314,344 B1 | | 11/2001 | Sauer et al. | |
| 6,317,660 B1 | * | 11/2001 | Barker et al. | 701/13 |
| 6,417,798 B1 | * | 7/2002 | Joerck | 342/355 |
| 6,608,589 B1 | * | 8/2003 | Devereux et al. | 342/357.06 |
| 6,735,501 B1 | * | 5/2004 | Rulison et al. | 701/13 |

* cited by examiner

LOW EARTH ORBIT SATELLITE COMMAND PLANNING DEVICE AND METHOD, AND LOW EARTH ORBIT SATELLITE CONTROL SYSTEM INCLUDING THE SAME

CROSS REFERENCE TO RELATED APPLICATION

This application is based on Korea Patent Application No. 2002-74682 filed on Nov. 28, 2002 in the Korean Intellectual Property Office, the content of which is incorporated herein by reference.

BACKGROUND OF THE INVENTION (a) Field of the Invention

The present invention relates to a control system for an LEO (low-earth orbit) satellite. More specifically, the present invention relates to an LEO satellite command planning device and method thereof, and an LEO satellite control system including the same for an LEO satellite control system to plan mission commands so that a satellite may execute missions according to a mission schedule that is a mission plan result.

(b) Description of the Related Art

Satellite missions are planned by a ground control system according to requests by a satellite user. In the mission planning, it is required to appropriately arrange the satellite missions without clash of the missions, and results obtained from the appropriate arrangement is a mission schedule.

To operate the satellite according to the above-planned mission schedule, it is needed for the ground control system to transmit satellite commands recognizable by the satellite to the satellite. In this instance, tasks of generating from the satellite task schedule the tasks that will be transmitted to the satellite are referred to as a satellite command plan Also, satellite commands resulting from the satellite task schedule are converted to radio wave signals and transferred to the satellite when the LEO satellite passes over the control station.

Meanwhile, since the satellite commands for executing predetermined satellite tasks do not include a single telecommand but rather they comprise a set of commands for sequentially operating various devices in the satellite, it is impossible to map a single task into a single satellite command. Also, the identical satellite task can be configured as a different set of satellite commands depending on related parameters. For example, regarding a task of photographing earth images, configurations of a set of sequentially executed task commands are differentiated according to the states of with what degrees of a roll angle the satellite are to shoot the earth images.

The satellite commands are classified as real time commands, absolute time commands, and relative time commands according to execution time. The relative time commands are defined to execute commands after previous commands have been executed and a predetermined time has passed. In general, the satellite commands that are to be sequentially executed are included in the set of satellite commands, which are referred to as a relative time command sequence. Actually, the satellite commands mingled with the previously-noted real time commands, absolute time commands, and relative time commands in a complex manner are transferred to the satellite.

In the conventional satellite control system, an operator can define a single set of satellite commands allocated to a predetermined satellite task. However, the operator cannot select an inner configuration of the set of satellite commands that are to be differentiated according to the parameters related to the satellite tasks in the satellite control system, it is required for a satellite operator to manually select the configuration of the set of satellite commands following the corresponding parameters and input the same as data. If a wrong set of satellite commands is transferred to the satellite because of mistakes of the operator, the satellite malfunctions and enters into a safe hold mode. It then requires a lot of time and effort to switch the satellite to the normal mode, and the satellite cannot execute the tasks while switching to the normal mode.

SUMMARY OF THE INVENTION

It is an advantage of the present invention to provide a low-earth orbit satellite command plan device and method, and a low-earth orbit satellite control system including the same for defining a plurality of sets of satellite commands related to satellite tasks, and enabling the control system to automatically select a set of satellite commands and process it.

In one aspect of the present invention, in an apparatus for analyzing orbit and attitude data of a low-earth orbit satellite to establish a task schedule and generating a satellite command, a low earth orbit satellite command planning apparatus comprises: a satellite event predictor for predicting various events related to the satellite; a satellite task schedule planner for referring to the event to schedule a task schedule of the satellite, and establishing a satellite task schedule; a satellite telecommand planner for generating a set of telecommand data to be executed by the satellite according to the satellite task schedule established by the satellite task schedule planner; and a mapping rule applier including a plurality of mapping rules applied to the respective task schedules of the satellite.

The respective satellite tasks of the satellite task schedule established by the satellite task schedule planner include an ID, an execution time, and a parameter, and the satellite telecommand planner compares the parameter condition with mapping rules of the mapping rule applier and automatically generates a set of satellite commands corresponding to the mapping rules matched with the condition.

The apparatus further comprises a first user interface for establishing the mapping rules, and the first user interface comprises: a list display for displaying a mapping rule list; an information display for a mapping rule name, a task name to which the mapping rule is applied, and a relative time command sequence; and a condition display for displaying a mapping condition according to a parameter of the task, and the mapping condition includes a plurality of logical operation conditions and comparison conditions.

The logical operation conditions and comparison conditions include a logical product (AND), a logical sum (OR), an equal sign (=), a greater than sign (>), and a less than sign (<).

The apparatus further comprises a second user interface for defining the relative time command sequence, and the second user interface comprises: a list display for displaying a relative time command sequence list; a command display for displaying a list of commands that can be added to a name of the relative time command sequence; and a command sequence display for displaying a set of commands included in the name of the relative time command sequence, and the second user interface selects the command included in the command display and edits a command set sequence of the command sequence display.

In another aspect of the present invention, a satellite command planning method for a satellite control system to generate a satellite command from a satellite task schedule comprises: (a) comparing a satellite task included in a plurality of satellite task schedules with a predefined mapping rule when the satellite task schedules are input; (b) generating a set of commands defined by a corresponding mapping rule when the mapping rule corresponding to a condition of the satellite task is found after the comparison, and comparing a next satellite task with a next mapping rule when no mapping rule corresponding to the satellite task is found; (c) generating a preliminary satellite command plan based on the generated set of satellite commands; and (d) inserting a satellite command indicator additionally needed for the satellite command, and generating a final command plan.

A single mapping rule includes a plurality of sets of satellite commands in (b), and (b) comprises selecting a single set of satellite commands corresponding to a parameter of the satellite task from among the sets of satellite commands.

In still another aspect of the present invention, in a control system for monitoring and controlling a low earth orbit satellite, a LEO (low earth orbit) satellite control system comprises: an antenna for executing radio communication with the satellite; a satellite operating system for receiving a telemetric signal of the satellite, processing and analyzing the signal, and transmitting a telecommand signal to the satellite through the antenna; a task analysis and planning system for analyzing orbit and attitude data of the satellite to establish a task schedule, and applying a plurality of mapping rules according to the established task schedule to generate a set of telecommand data; and an interface for transmitting and receiving data between the systems.

The task analysis and planning system comprises: a satellite event predictor for predicting various events related to the satellite; a satellite task schedule planner for referring to an event to schedule a task schedule of the satellite, and establishing a satellite task schedule; a satellite telecommand planner for generating a set of telecommand data to be executed by the satellite according to the satellite task schedule established by the satellite task schedule planner; and a mapping rule applier including a plurality of mapping rules applied to the respective task schedules of the satellite.

The satellite operating system comprises: a signal transmit/receive converter for receiving a telemetric signal of the satellite and transmitting a telecommand signal to the satellite through the antenna; a satellite telesurveillance unit for processing and analyzing the telemetric signal received from the satellite to monitor the states of the satellite; and a satellite telecommand transmitter for transmitting a control command required for the satellite.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
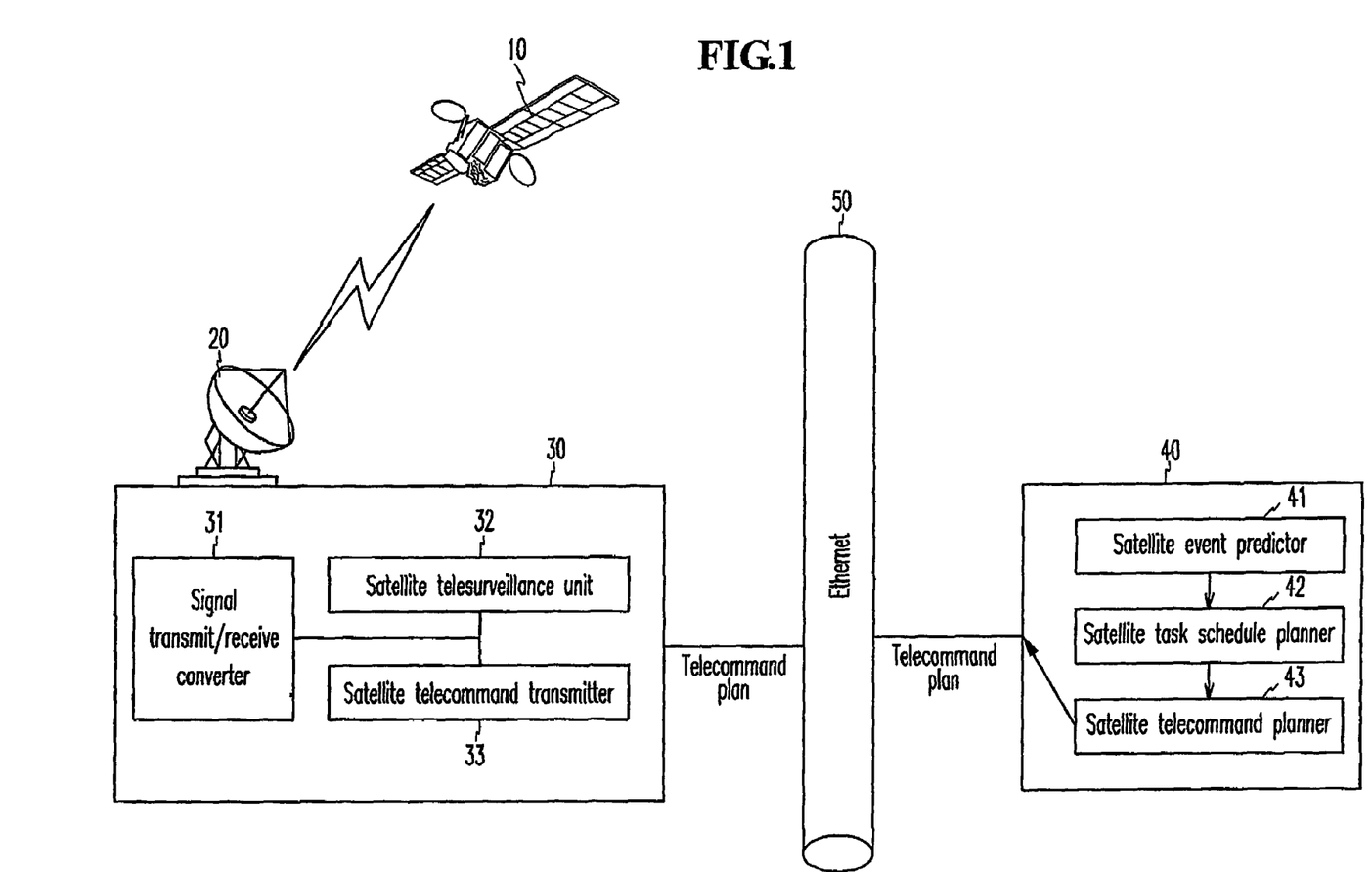
FIG. 1 shows a configuration of a general satellite control system to which a preferred embodiment of the present invention is applied.

FIG. 1 shows a configuration of a general satellite control system to which a preferred embodiment of the present invention is applied.

As shown in FIG. 1, the general satellite control system comprises a satellite 10, an antenna 20, a satellite operating system 30, a task analysis and planning system 40, and an interface Ethernet 50.

The satellite 10 is a control target of the ground control system, and the antenna 20 executes radio communication with the satellite 10. Also, the satellite operating system 30 executes telemetry and telecommand of the satellite 10, and comprises a signal transmit/receive converter 31, a satellite telesurveillance unit 32, and a satellite telecommand transmitter 33. The signal transmit/receive converter 31 receives telemetric signals of the satellite 10 and transmits telecommand signals to the satellite 10 through the antenna 20. The satellite telesurveillance unit 32 process and analyzes the telemetric signals received from the satellite 10 to monitor the states of the satellite 10, and the satellite telecommand transmitter 33 transmits control commands required for the satellite 10.

Also, the task analysis and planning system 40 analyzes orbit and attitude data of the satellite 10, and plans task execution, and comprises a satellite event predictor 41, a satellite task schedule planner 42, and a satellite telecommand planner 43. The satellite event predictor 41 predicts various satellite events. The satellite task schedule planner 42 refers to the satellite events to schedule a task schedule of the satellite 10, and establishes the satellite task schedule. The satellite telecommand planner 43 generates a data set of telecommands to be executed by the satellite 10 according to the satellite task schedule established by the satellite task schedule planner 42.

Also, the satellite telecommand plan generated by the satellite telecommand planner 43 is transmitted to the satellite 10 through the Ethernet 50 and the satellite telecommand transmitter 33 of the satellite operating system 30.

The satellite control system further comprises a mapping rule applier (not illustrated) including a plurality of mapping rules applied to respective task schedules so as to automate the command plan of the satellite.

Figure 2:
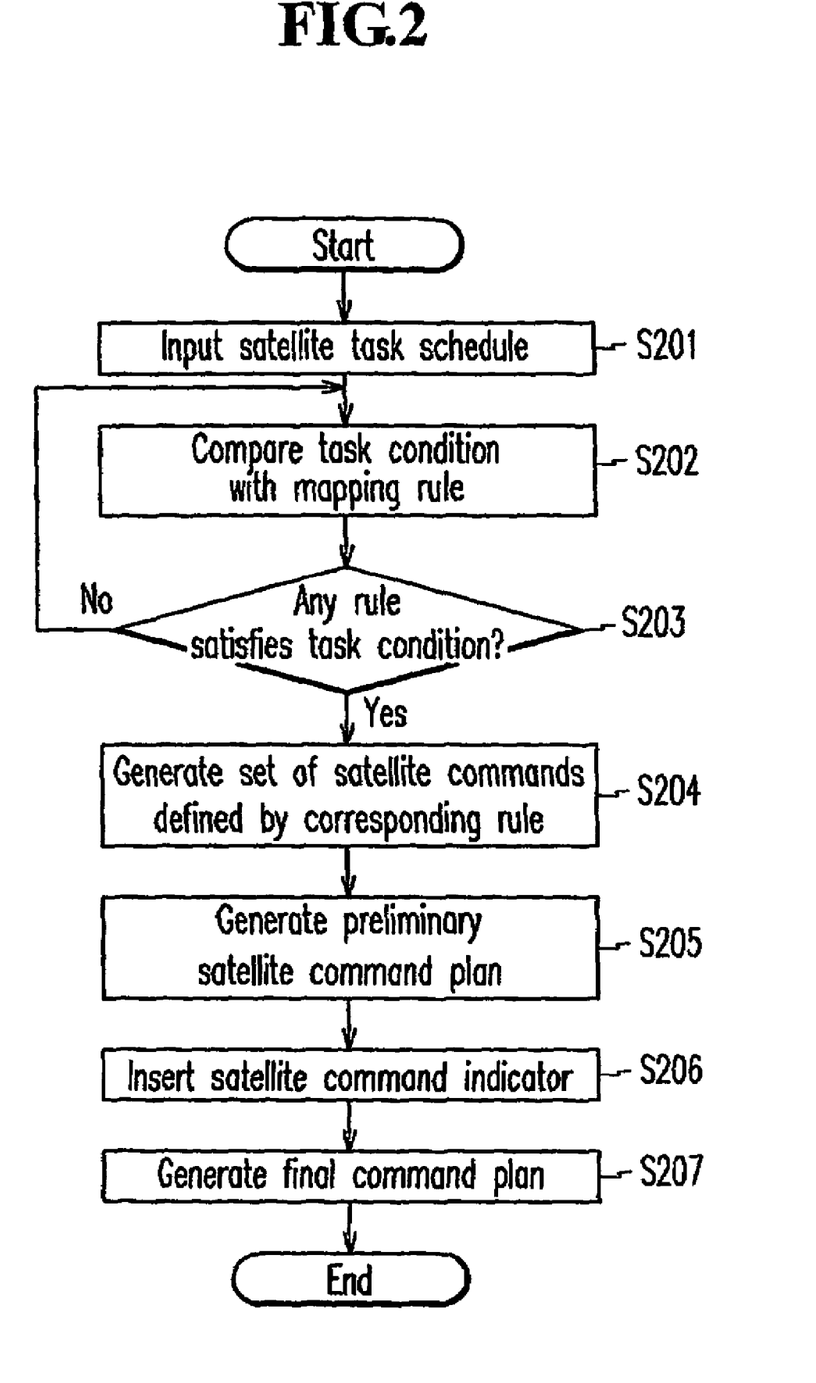
FIG. 2 shows a flowchart of an automation process for a satellite command plan according to a preferred embodiment of the present invention.

FIG. 2 shows a flowchart of an automation process for a satellite command plan according to a preferred embodiment of the present invention.

As shown in FIG. 2, when a plurality of satellite task schedules is input in step S201, the satellite task schedules are sequentially transferred to the mapping rule applier, and the mapping rule applier then compares the transferred satellite tasks with all the predefined mapping rules in step S202. In this instance, if a mapping rule satisfies the condition of the satellite tasks from among the predefined mapping rules, a set of satellite commands defined by the corresponding mapping rule is generated in step S204. Also, when no mapping rule is matched with the condition of the satellite tasks in the process of comparing the satellite task and the mapping rule in the previous step of S202, the satellite task is compared with a next mapping rule. When the task of comparing the mapping rules with all the satellite task schedules is finished, a preliminary satellite command plan is generated based on the generated set of satellite commands in step S205. After this, additional satellite command indicators are inserted into the satellite command in step S206, and a final command is generated in step S207.

Figure 3:
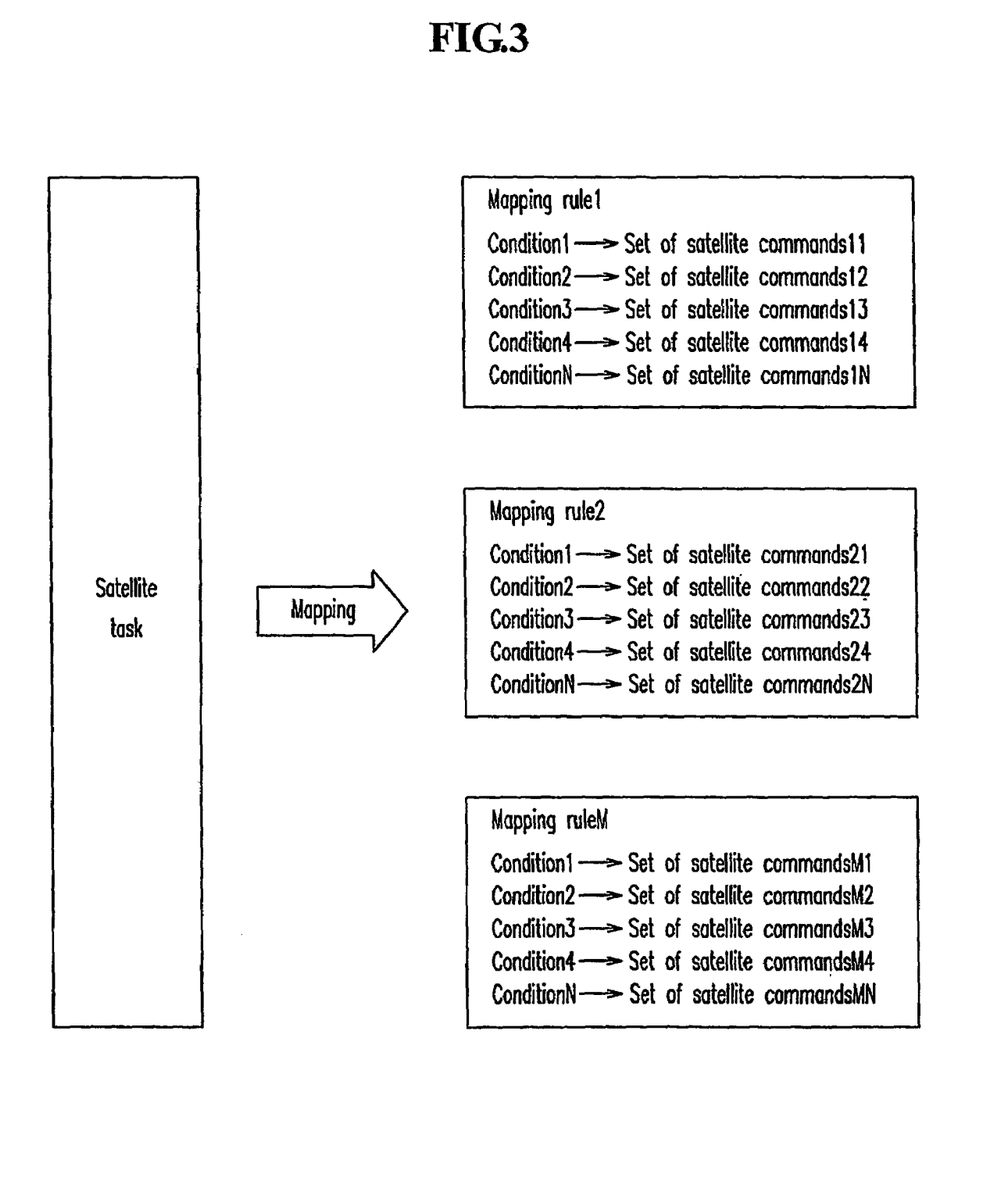
FIG. 3 shows an application example of a satellite task to mapping rules according to a preferred embodiment of the present invention.

FIG. 3 shows an application example of a satellite task to the mapping rules according to a preferred embodiment of the present invention.

As shown in FIG. 3, respective satellite tasks including IDs, execution times, and parameters are assigned a set of satellite commands according to the respective corresponding mapping rules and conditions.

That is, when the mapping rule 1 respectively satisfies the conditions 1 through N, sets of satellite commands 11 through 1 N are respectively allocated. Sets of satellite commands are respectively allocated to the mapping rules 1 through M according to their conditions.

Figure 4:
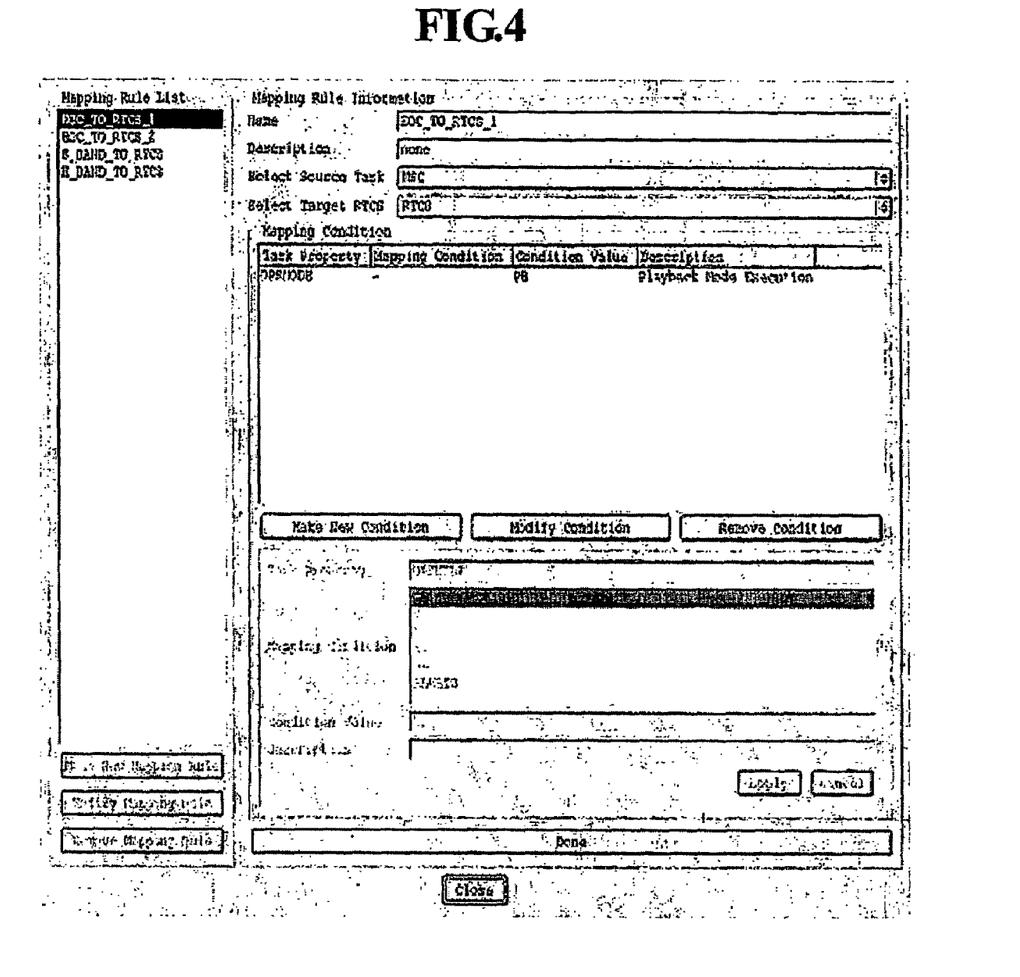
FIG. 4 shows an exemplified user interface on a mapping rule establishment of a set of commands in the automation method for a satellite command plan according to a preferred embodiment of the present invention.

FIG. 4 shows an exemplified user interface on a mapping rule establishment of a set of commands in the automation method for a satellite command plan according to a preferred embodiment of the present invention.

As shown in FIG. 4, it can be defined which mapping rule can be applied through the user interface according to a satellite task name and a parameter condition.

That is, the task name for defining the mapping rule of EOC_TO_RTCS_1 in the mapping rule list is SMC, and this is processed by the RTCS (real time command sequence.) Also, when the parameter OPSMODE (task property) in the satellite task MSC is matched with PB (condition value) as shown with the mapping condition '=', it is contrary to the mapping rule of EOC_TO_RTCS_1. In this instance, the various mapping conditions used for the mapping rules include the symbols (=, <, >, <=, >=, and ALWAYS).

Figure 5:
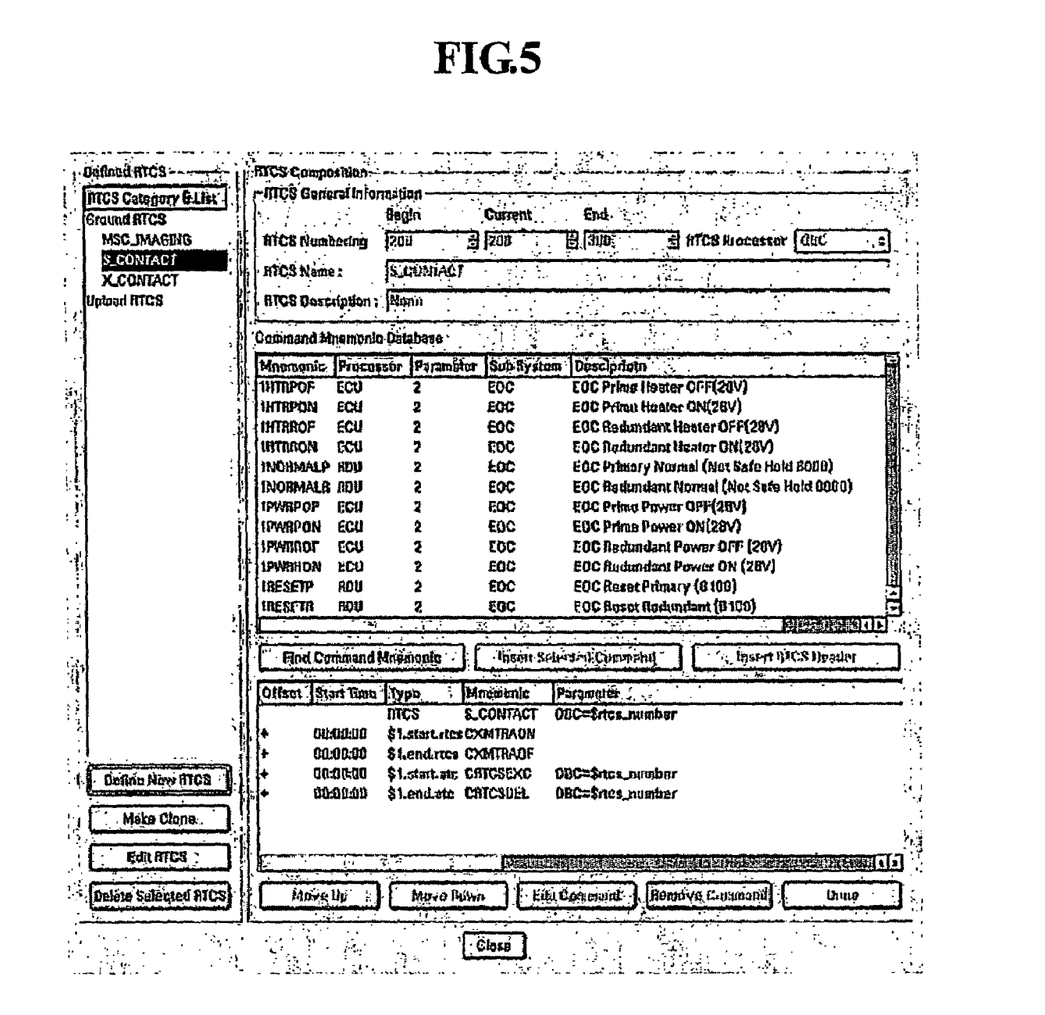
FIG. 5 shows an exemplified user interface on a definition of a relative time command sequence in the automation method for a satellite command plan according to a preferred embodiment of the present invention.

FIG. 5 shows an exemplified user interface on a definition of a relative time command sequence in the automation method for a satellite command plan according to a preferred embodiment of the present invention.

As shown in FIG. 5, the RTCS (relative time command sequence) configured according to names is displayed on the user interface by the definition of the relative time command sequence which can be edited through the user interface.

That is, a sequence of a set of commands on the S_CONTACT which is an RTCS can be defined as the bottom right part of FIG. 5. In this instance, a list of available commands is shown on the top right thereof. Therefore, the user can edit the commands included in S_CONTACT by selecting a desired command from a command mnemonic database.

As described, the present invention automates the process of executing the command plan for converting the satellite task schedule planned on the ground into telecommands available to the satellite in the low-earth orbit satellite control system, thereby preventing malfunctions of the satellite caused by mistakes of control system operators and minimizing the efforts needed for recovering from malfunctions of the satellite.

Also, the present invention automatically selects a data set established by the parameters related to the execution task of the satellite according to the mapping rule when a low-earth orbit satellite passes over a ground control system and transfers a combination of telecommands to the satellite, thereby eliminating the need for the control system operator to select the command data for the telecommand each time and combine them into a set, escaping probable mistakes caused by this troublesome selection and combination, and allowing more effective control management.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. In an apparatus for analyzing orbit and attitude data of a low-earth orbit satellite to establish a task schedule, and generating a satellite command, a low earth orbit satellite command planning apparatus comprising:
   a satellite event predictor for predicting various events related to the satellite;
   a satellite task schedule planner for referring to the predicted various events and to inputted satellite tasks to schedule a satellite task schedule;
   a satellite telecommand planner for generating a set of telecommand data to be executed by the satellite according to the satellite task schedule established by the satellite task schedule planner;
   a mapping rule applier including a plurality of mapping rules applied to the respective inputted satellite tasks of the satellite;
   a first user interface for applying a mapping rule in accordance to a satellite task name and a parameter condition; and
   a second user interface for selecting desired commands from a list of available commands to define a relative time command sequence in the satellite task schedule.

2. The apparatus of claim 1, wherein the satellite task schedule established by the satellite task schedule planner include an ID, an execution time, and a parameter, and the satellite telecommand planner compares the parameter condition with mapping rules of the mapping rule applier, and automatically generates a set of satellite commands corresponding to the mapping rules matched with the condition.

3. The apparatus of claim 1, wherein the first user interface establishes the mapping rules such that the first user interface comprises:
   a list display for displaying a mapping rule list;
   an information display for displaying a mapping rule name, the satellite task name to which the mapping rule is applied, and the relative time command sequence; and
   a condition display for displaying a mapping condition in accordance to the parameter condition of the satellite task name, and the mapping condition includes a plurality of logical operation conditions and comparison conditions.

4. The apparatus of claim 3, wherein the logical operation conditions and comparison conditions include a logical product (AND), a logical sum (OR), an equal sign (=), a greater than sign (>), and a less than sign (<).

5. The apparatus of claim 3, wherein the second user interface defines the relative time command sequence such that the second user interface comprises:
   a list display for displaying the list of available commands;
   a command display for displaying the list of available commands that can be added to the relative time command sequence; and a command sequence display for displaying the selected commands included in the relative time command sequence; and wherein the second user interface selects desired commands and edits the relative time command sequence of the command sequence display.

6. A satellite command planning method for a satellite control system to generate a satellite telecommand from a satellite task schedule, comprising:

predicting, using a task analysis and planning system (TAPS), various satellite events;

applying, using a first user interface, a mapping rule in accordance to a satellite task name and a parameter condition;

comparing, using the TAPS, a satellite task included in a plurality of satellite task schedules with the predefined mapping rule when the satellite task schedules are input into the TAPS;

generating, using the TAPS, a set of commands defined by a corresponding mapping rule when the mapping rule corresponding to a condition of the satellite task is found after the comparison, and comparing a next satellite task with a next mapping rule when no mapping rule corresponding to the satellite task is found;

planning, using the TAPS, a preliminary satellite command plan based on the predicted various satellite events and the generated set of satellite commands;

selecting, using a second user interface, desired commands from a list of available commands to define a relative time command sequence in the satellite task schedule; and inserting, using the TAPS, a satellite command indicator additionally needed for the satellite command from the preliminary satellite command plan to establish a finalized telecommand plan.

7. The method of claim 6, wherein a single mapping rule includes a plurality of sets of satellite commands in the generating step, the generating step comprises selecting a single set of satellite commands corresponding to a parameter of the satellite task from among the sets of satellite commands.

8. In a control system for monitoring and controlling a low earth orbit satellite, a LEO (low earth orbit) satellite control system comprising:

an antenna for executing radio communication with the satellite;

a satellite operating system for receiving a telemetric signal of the satellite, processing and analyzing the signal, and transmitting a telecommand signal to the satellite through the antenna;

a task analysis and planning system (TAPS) for analyzing orbit and attitude data of the satellite, for predicting various satellite events, and for inputting satellite task schedules to establish a finalized telecommand plan by applying a plurality of mapping rules according to the established task schedule to generate a set of telecommand data;

a first user interface for applying a mapping rule in accordance to a satillite task name and a parameter condition;

a second user interface for selecting desired commands from a list of available commands to define a relative time command sequence in the satellite task schedule; and an interface for transmitting and receiving data between the systems.

9. The LEO satellite control system of claim 8, wherein the TAPS comprises:

a satellite event predictor for predicting various events related to the satellite;

a satellite task schedule planner for referring to the predicted various events and to inputted satellite tasks to schedule a satellite task schedule;

a satellite telecommand planner for generating a set of telecommand data to be executed by the satellite according to the satellite task schedule established by the satellite task schedule planner; and a mapping rule applier including a plurality of mapping rules applied to the respective inputted satellite tasks of the satellite.

10. The LEO satellite control system of claim 8, wherein the satellite operating system comprises:

a signal transmit/receive converter for receiving a telemetric signal of the satellite and transmitting a telecommand signal, corresponding to the finalized telecommand plan, to the satellite through the antenna;

a satellite telesurveillance unit for processing and analyzing the telemetric signal received from the satellite to monitor the states of the satellite; and a satellite telecommand transmitter for transmitting a control command required for the satellite.

11. The method of claim 6 further comprising sending through an ethernet the telecommand plan to a satellite operating system (SOS).

12. The method of claim 11 further comprising transmitting the telecommand plan to a Low Earth Orbit (LEO) satellite.

13. The method of claim 6 wherein the predicting step is performed with a satellite event predictor of the TAPS.

14. The method of claim 6 wherein the generating step is performed with a satellite task schedule planner of the TAPS.

15. The method of claim 6 wherein the planning step is performed with a satellite telecommand planner of the TAPS.

16. The method of claim 6 wherein the inserting step is performed with a satellite telecommand planner of the TAPS.

* * * * *